No. 628,848. Patented July 11, 1899.
F. M. RADKE.
STEAM HEATER.
(Application filed Apr. 12, 1899.)
(No Model.) 3 Sheets—Sheet 1.

WITNESSES:
Chas. R. King
C. R. Ferguson

INVENTOR
Fredrick M. Radke.
BY
Munn
ATTORNEYS.

No. 628,848. Patented July 11, 1899.
F. M. RADKE.
STEAM HEATER.
(Application filed Apr. 12, 1899.)

(No Model.) 3 Sheets—Sheet 2.

WITNESSES: Chas. D. King, C. R. Ferguson

INVENTOR Fredrick M. Radke
BY
ATTORNEYS.

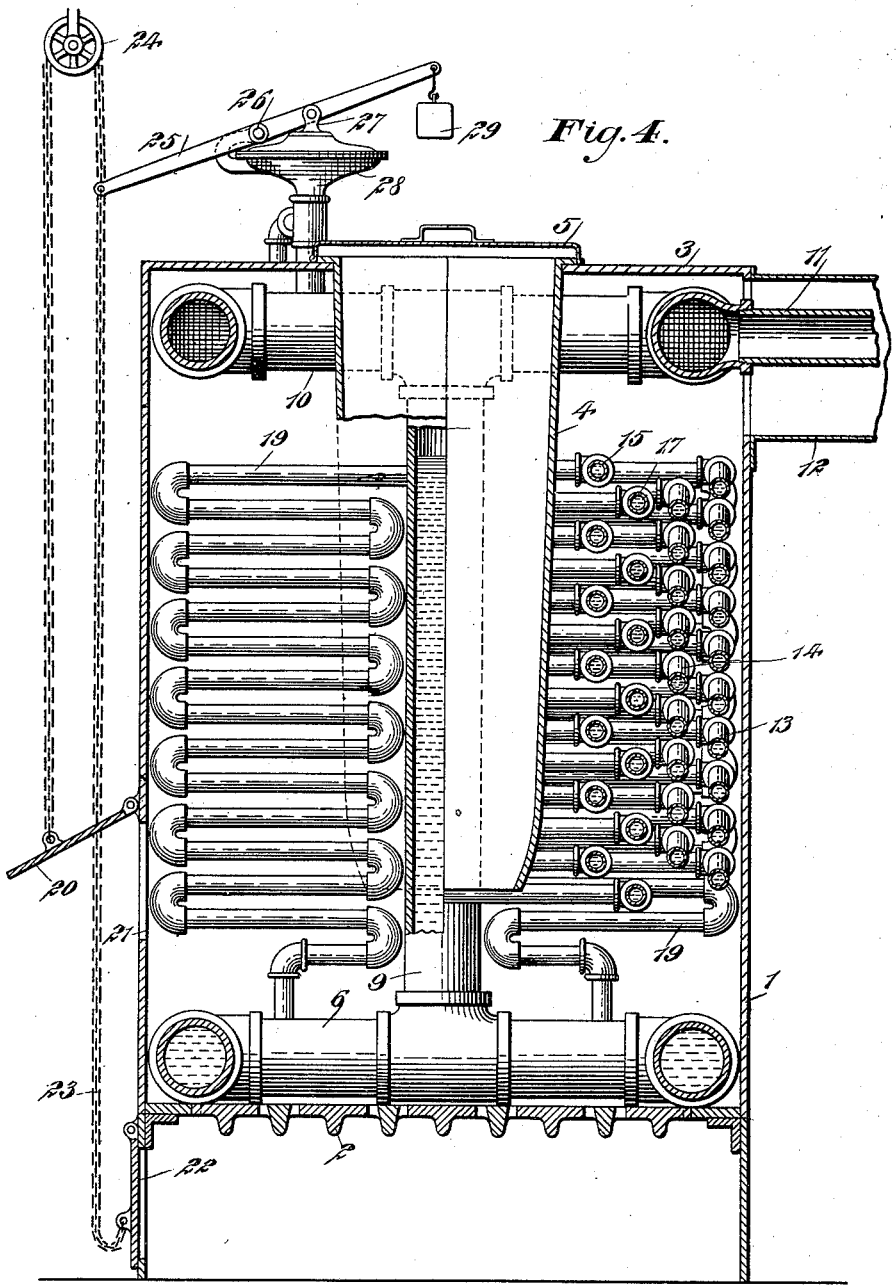

UNITED STATES PATENT OFFICE.

FREDRICK MAX RADKE, OF NEW YORK, N. Y.

STEAM-HEATER.

SPECIFICATION forming part of Letters Patent No. 628,848, dated July 11, 1899.

Application filed April 12, 1899. Serial No. 712,741. (No model.)

*To all whom it may concern:*

Be it known that I, FREDRICK MAX RADKE, of the city of New York, borough of Manhattan, in the county of New York and State of New York, have invented a new and Improved Steam-Heater, of which the following is a full, clear, and exact description.

This invention relates to improvements in steam-heaters more particularly designed for heating dwellings and other buildings; and the object is to provide a heater of this character that shall be comparatively simple in construction and cheap to manufacture and that because of its simplicity of construction can be easily and quickly taken apart for the purpose of making repairs or cleaning, thus minimizing the cost of making such repairs, and, further, to so construct it that very little attention is required to keep the heater in heating order.

I will describe a steam-heater embodying my invention and then point out the novel features in the appended claims.

Reference is to be had to the accompanying drawings, forming a part of this specification, in which similar characters of reference indicate corresponding parts in all the figures.

Figure 1:
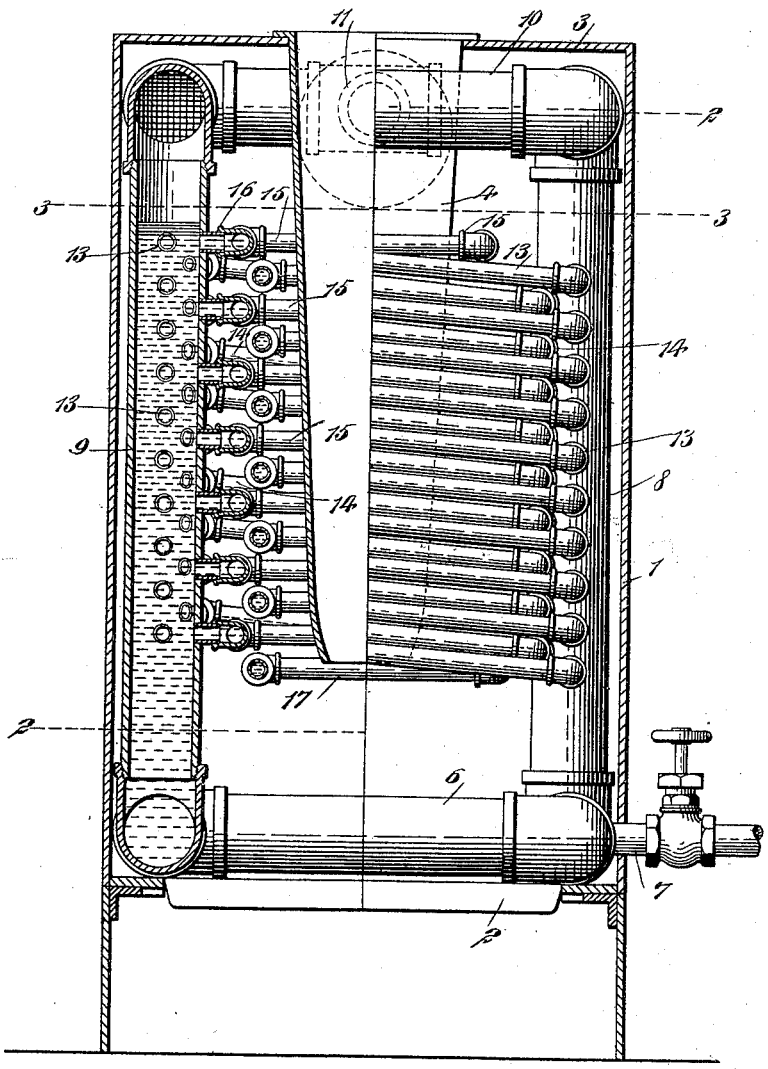
Figure 2:
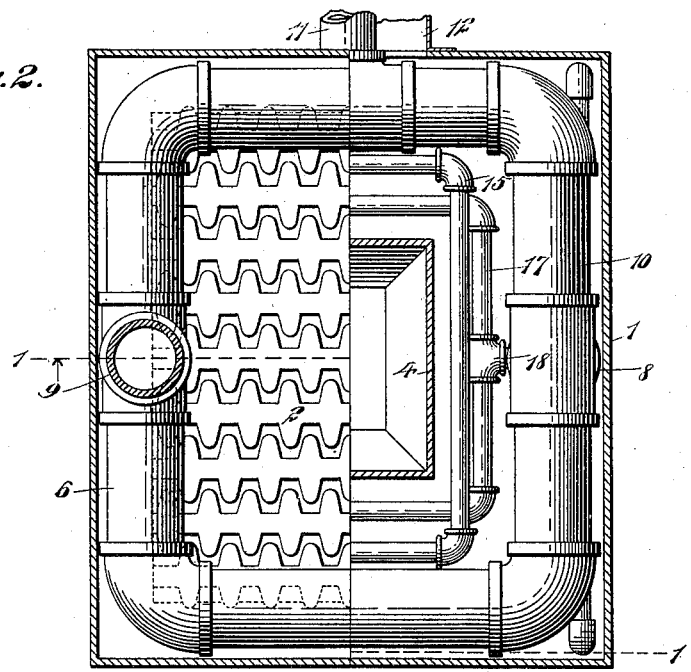
Figure 3:
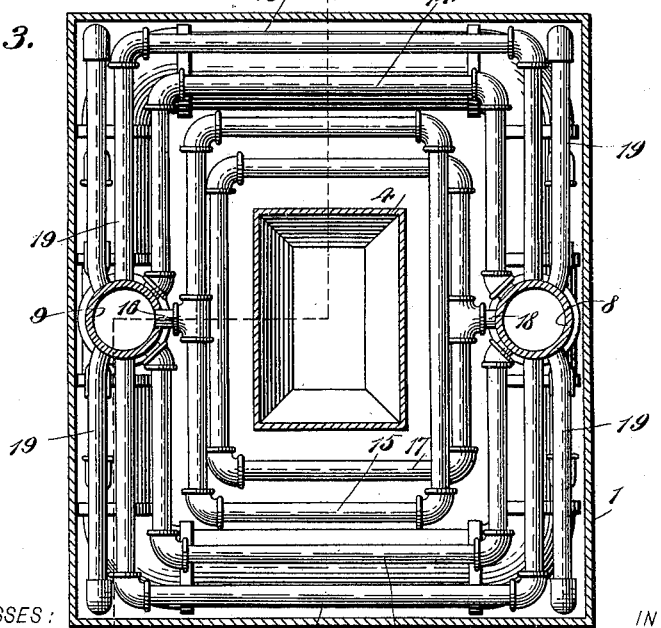

Figure 1 is a partial elevation and partial section on the line 1 1 of Fig. 2. Fig. 2 is a partial plan and partial section on the line 2 2 of Fig. 1. Fig. 3 is a section on the line 3 3 of Fig. 1. Fig. 4 is a section on the line 4 4 of Fig. 3.

Referring to the drawings, 1 designates the shell or casing of the heater, in the lower portion of which is a grate 2, of any suitable construction, but preferably of the rocking character. Extended through the top 3 of the casing or shell and terminating at a suitable point above the grate 2 is a feeder 4, provided with a suitable cover 5. Arranged in the shell or casing just above the grate 2 is a mud-drum 6, which extends around the four sides of the shell or heater and has a valve-controlled pipe 7. From opposite members of the mud-drum stand-pipes 8 9 extend upward and communicate with a steam-drum 10, similar in shape to the mud-drum 6. This steam-drum has a circulating-pipe 11 extended from it, and, as shown in the drawings, this circulating-pipe 11 extends through a portion of the smokepipe 12. Arranged in the heater and having communication with the stand-pipes 8 and 9 is a series of water-circulating tubes 13, arranged one above another, and another series of circulating-tubes 14 is arranged within the heater and between the pipes 13 and the feeder 4. These several pipes 14 communicate with the stand-pipes 8 and 9, and the several pipes are arranged on an incline relatively to the stand-pipes.

Surrounding the feeder 4 is a series of pipes 15, which communicate through thimbles 16 with the stand-pipe 9, and also surrounding this feeder 4 is a series of circulating-tubes 17, which have communication with the stand-pipe 8 through the thimbles 18. The several circulating-tubes are preferably staggered, so that the products of combustion passing up between the tubes will strike upon all portions of them, thus thoroughly and quickly heating the water contained in the tubes.

At opposite sides of the casing or shell and within the same are two pairs of pipes 19, the several connected members of each set being arranged parallel one with another. The lower portions of these pipes 19 communicate with the mud-drum 6 and the upper portions of the pipes 19 on one side communicate at their upper ends with the stand-pipe 8, and those on the other side communicate at the upper end with the stand-pipe 9.

A draft-door 20 is provided to control the opening 21 through the shell or casing above the grate 2, and a draft-door 22 is provided to control an opening below the grate. These draft-doors 20 and 22 are connected by a chain or similar device 23, which extends upward over a pulley 24, and having connection with this chain is a lever 25, which is fulcrumed at 26 and has connection with the stem 27, extended from a diaphragm within the regulator 28, which has connection with the steam-drum. A weight 29 is attached to the lever 25 at the end opposite that connected to the chain.

In operation the water-level in the stand-pipes 8 and 9 will be a short distance below the steam-drum and of course above the highest ones of the circulating-tubes. After starting the fire in the heater the feeder 4 is to be filled with coal or other material to be burned, and of course as the coal or the like is consumed on the grate a new supply will be constantly fed by gravity from the feeder. Therefore after once filling the feeder it is obvious that the heater will require no attention until the feeder becomes empty. As the mud-drum, stand-pipes, and circulating-coils and also the steam-drum are wholly within the shell or casing, they are all subjected to heat, so that steam may be quickly generated by a comparatively small consumption of fuel.

The tubes 19 being arranged close to the walls of the shell or casing will not only receive the heat that circulates around them, but will receive the heat passing between them and the said walls. Should the heat become excessively high, the lever 25 will be operated to close the door 22 and open the door 20, and should it become too low the lever will be operated to close the door 20 and open the door 22.

It will be noted that because of the arrangement of tubes in which the steam is generated the steam is forced directly into service when at its driest and hottest point, and owing to the small amount of coal required and the fact that the heater is equipped with all the appliances, including a self-feeder, necessary to make it thoroughly automatic in character it requires less attention than certain other heaters.

Having thus fully described my invention, I claim as new and desire to secure by Letters Patent—

1. A steam-heater, comprising a casing or a shell, a grate arranged in the lower portion thereof, a mud-drum extended around the inner side of the casing or shell at the lower end, a steam-drum extended around the inner side of the casing or shell at the upper end, opposite stand-pipes connecting the mud-drum and steam-drum, a series of circulating-tubes communicating with one of the stand-pipes, another series of circulating-tubes communicating with the other stand-pipe, and a feeder extended downward from the top of the shell or casing nearly to the grate, said feeder being surrounded by the circulating-tubes but entirely free therefrom, substantially as specified.

2. A steam-heater, comprising a casing or shell, a grate arranged in the lower portion thereof, a mud-drum extended around the inner side of the casing or shell, a steam-drum extended around the inner side of the casing or shell at the upper end, opposite stand-pipes connecting the mud-drum and steam-drum, a series of circulating-tubes communicating with one of the stand-pipes, another series of circulating-tubes communicating with the other of the stand-pipes, a feeder extended downward from the top of the shell or casing nearly to the grate, the said feeder being surrounded by the circulating-tubes but entirely free therefrom, and a pipe 19 at the outer side of one of the stand-pipes and communicating at its upper end with said stand-pipe and at its lower end with the mud-drum, substantially as specified.

3. A steam-heater, comprising a shell or casing, a grate in the lower portion thereof, a mud-drum arranged in the casing or shell above the grate, a steam-drum in the casing or shell and near the top thereof, stand-pipes connecting the two drums, a feeder extended from the top of the casing or shell and terminating at a point above the grate, a series of circulating-tubes surrounding the feeder and communicating with the stand-pipes, another series of circulating-tubes surrounding the feeder and communicating with one of the stand-pipes, another series of circulating-tubes surrounding the feeder and communicating with the other of said stand-pipes and pipes at opposite sides of the furnace, the pipes at one side communicating at the upper end with the stand-pipe at that side and also with the mud-drum at the lower end, the pipes at the other side communicating at the top with a stand-pipe at said other side and communicating at the bottom with the mud-drum, substantially as specified.

FREDRICK MAX RADKE.

Witnesses:
JOHN J. ELMORE,
EDMOND J. BUTLER.